Jan. 3, 1967  A. H. PITCHFORD  3,295,622
STEERABLE LOAD-CARRYING VEHICLE
Filed Jan. 13, 1965  3 Sheets-Sheet 1
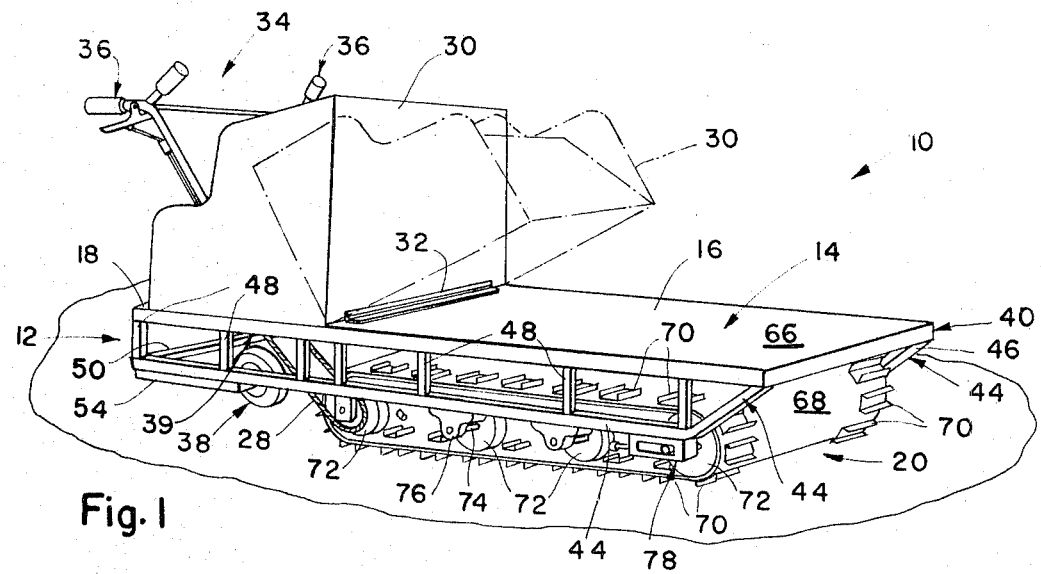
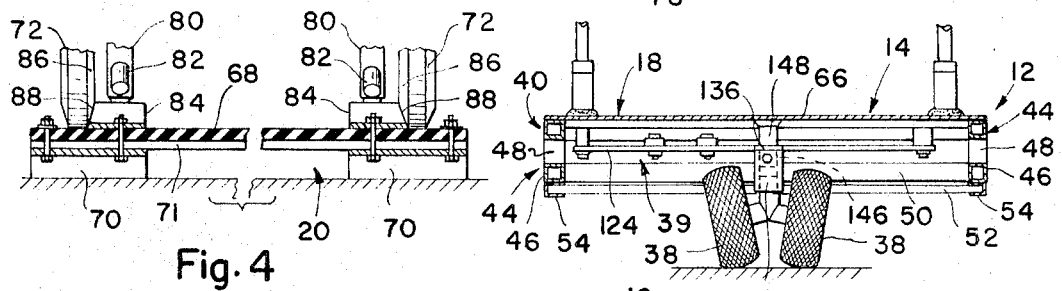
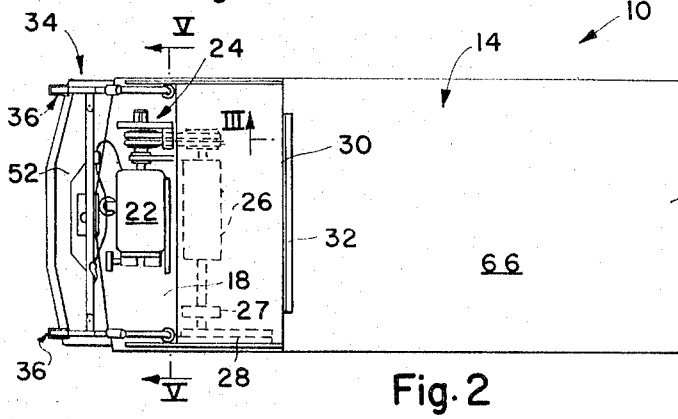
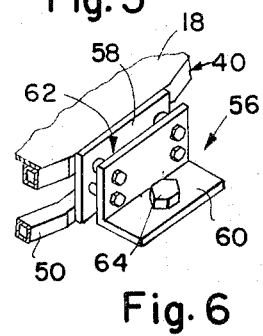
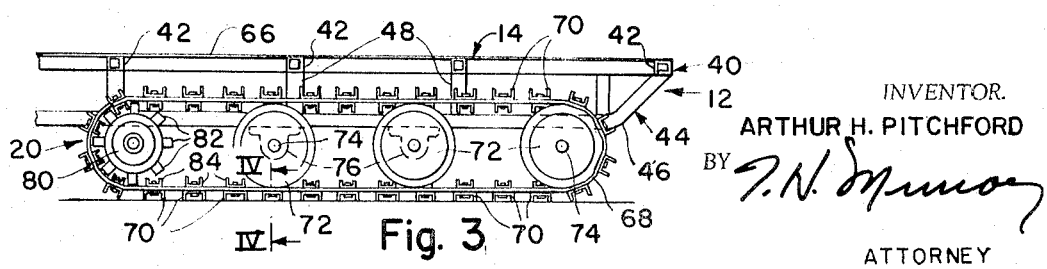
INVENTOR.
ARTHUR H. PITCHFORD
BY
ATTORNEY

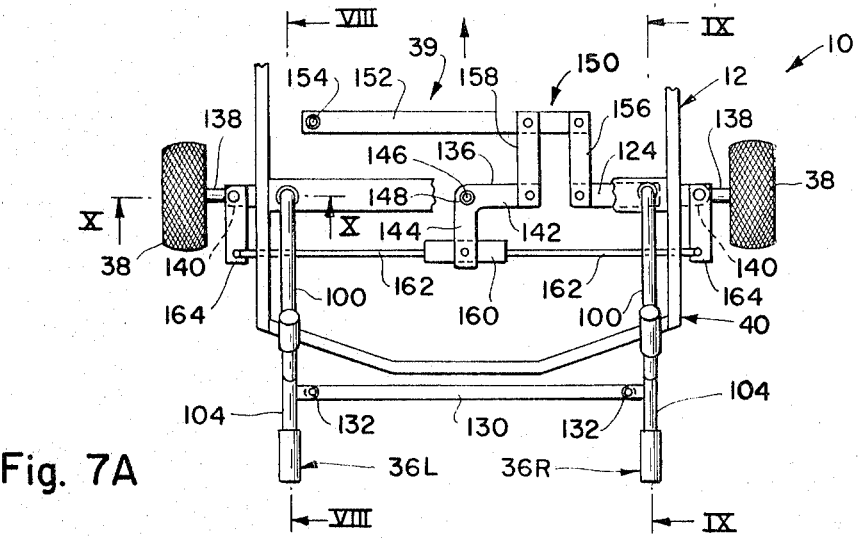

3,295,622
STEERABLE LOAD-CARRYING VEHICLE
Arthur H. Pitchford, 5881 Lorene Drive,
Bethel Park, Pa. 15102
Filed Jan. 13, 1965, Ser. No. 425,305
5 Claims. (Cl. 180—9.22)

This invention relates to powered, load-carrying vehicles of the type having na endless traction member adapting said vehicles for movement over a variety of ground surfaces, and more particularly to improvements in steering means for such vehicles.

Powered, load-carrying vehicles having an endless traction member have heretofore been provided. These vehicles move easily over a variety of ground surfaces along a straightline path of travel. These vehicles have, however, one major disadvantage in that they are hard to steer, i.e., the operator encounters difficulty when he attempts to turn the vehicle.

In one such vehicle of the prior art, the hard steering characteristic has been somewhat reduced by providing single tandem wheels with which a relatively small width endless traction member is engaged. This type of vehicle is similar to a wheelbarrow and is relatively easily turned or guided. However, the improvement in the steering characteristic of the vehicle is accomplished at a sacrifice in the stability of the vehicle.

Accordingly, as an overall object, the present invention seeks to provide a powered, load-carrying vehicle of the type described which is easily turned when desired.

Another object of the invention is to provide a load-carrying vehicle of the type described, having the combined advantages of being steerable, having great stability and being movable over a variety of ground surfaces.

Still another object of the invention is to provide a powered, load-carrying vehicle having guide wheels for steering the vehicle and which may be positioned outboard of the vehicle frame to increase the stability of the vehicle or within the confines of the vehicle frame so as to permit the vehicle to pass through narrow openings.

A further object of the invention is to provide steering means for vehicles of the type described wherein the operator thrust imposed on the steering means aids in turning the vehicle in the desired direction.

In accordance with the present invention, a load-carrying vehicle is provided comprising a frame supporting a platform which presents a relatively large forward portion adapted for carrying a variety of loads and a rear support portion adapted to the vehicle support drive means as well as a variety of auxiliary power equipment. A flexible, endless ground engaging traction member is operably mounted on the frame beneath the forward portion. The traction member preferably is cleated so that the vehicle moves easily regardless of the character of the terrain.

The present load-carrying vehicle also is provided with a pair of guide wheels which are mounted to the rear support portion of the platform. The guide wheels may, for example, be mounted outboard of the frame so as to increase the stability of the vehicle or they may be mounted beneath the rear support portion within the confines of the frame so as to permit the vehicle to pass through relatively narrow passageways.

Novel steering means is provided which is operatively connected to the guide wheels for pivoting the guide wheels in a direction opposite to the direction in which the vehicle is to be turned. The present steering means is arranged so that the direction in which the thrust is imposed on the steering means by the operator is opposite to the direction in which the vehicle is to be turned. That is, the operator pushes the rear of the vehicle in the direction in which the guide wheels are pointed.

The above and other objects and advantages of the present invention will become apparent from the following detailed description by reference to the accompanying drawings, in which:

FIGURE 1 is an isometric view of the present powered, load-carrying vehicle;

FIG. 2 is a plan view of the present powered, load-carrying vehicle;

FIG. 3 is a cross-sectional view taken along the line III—III of FIG. 2;

FIG. 4 is a cross-sectional view taken along the line IV—IV of FIG. 3;

FIG. 5 is a cross-sectional view taken substantially along the line V—V of FIG. 2;

FIG. 6 is a fragmentary isometric view illustrating a hitching device provided on the present vehicle;

FIGS. 7A–7C are fragmentary plan views illustrating the construction and operation of steering means of the present invention;

Load-carrying vehicle—General description

Figures 8, 9:
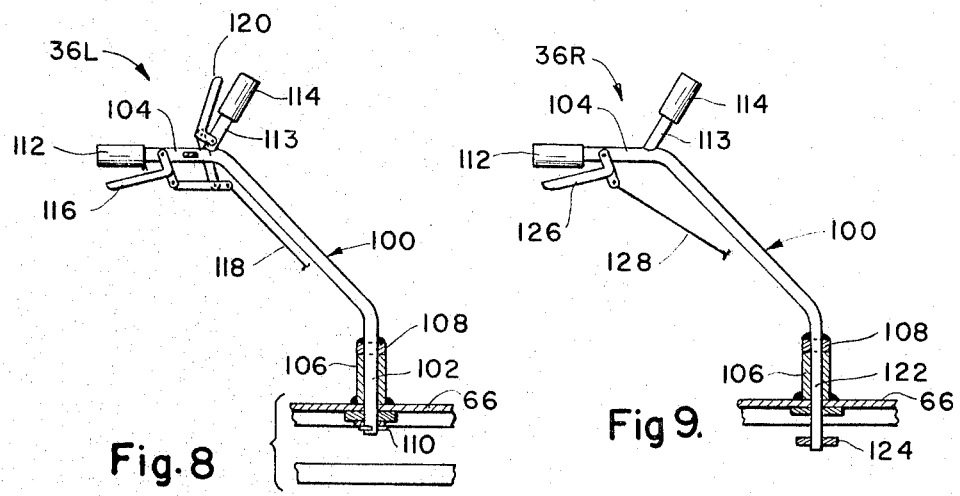
FIG. 8 is a cross-sectional view, taken along the line VIII—VIII of FIG. 7A, illustrating a handlebar.
FIG. 9 is a cross-sectional view taken along the line IX—IX of FIG. 7A illustrating another handlebar.

Referring now to FIGS. 1 and 2, there is shown a steerable, load-supporting vehicle indicated generally by the numeral 10. The vehicle 10 comprises a tubular frame 12 having platform means 14 providing a forward load-carrying portion 16 and a rear drive support portion 18. A flexible, endless ground engaging traction member 20 is operably supported on the frame 12 beneath the forward load-carrying portion 16. The traction member 20 permits the present steerable, load-supporting vehicle 10 to move easily over a variety of ground surface conditions.

Mounted on the rear drive support portion 18 is a drive means 22 which may comprise any suitable prime mover, such as an internal combustion engine. Connected to the drive means 22 by a suitable V-belt and pulley assembly 24, is a transmission 26 providing, for example, two speeds forward and one reverse. Connecting means, such as a drive chain 28, is employed to connect the traction member 20 to the drive means 22. A conventional brake 27 is interposed between the transmission 26 and the drive chain 28. A hood 30 is hinged as at 32, to the platform means 14. The hood 30 extends over the rear drive support portion 18 and serves to protect the drive means 22, the transmission 26 and any other auxiliary power equipment supported on the rear drive portion 18, from the materials being loaded on the forward load-carrying portion 16. The hood 30 being hinged as at 32, may be pivoted forwardly into the position shown in dash-dot outline so that mechanical adjustments and repairs may easily be made to the power equipment supported on the rear drive support portion 18 of the platform 14. The hood 30 also conveniently supports a gas tank (not shown) for the drive means 22 and a hydraulic fluid reservoir (not shown) for auxiliary hydraulically operated power equipment.

Associated with the rear drive support portion 18 is steering means 34 which, in this embodiment, comprises handlebar means 36, a pair of guide wheels 38 mounted to the platform means 14 beneath the rear drive support portion 18, and reverse acting linkage means 39 (not visible) for operatively connecting the handlebar means 36 to the guide wheels 38. As will become apparent later in the specification, the steering means 34 is arranged so that the handlebar means 36 are moved in a direction opposite to the direction in which the vehicle 10 is to be turned. The arrangement is such that the thrust imposed on the handlebar means 36 by the operator, aids in turning the vehicle 10 in the desired direction.

Tubular frame 12

Referring now to FIGS. 1, 3 and 5, the frame 12 preferably is formed from tubular steel members having a square transverse configuration and which are welded together to form a lightweight, extremely rugged frame. The frame 12 comprises a rectangular upper frame 40 including a plurality of cross brace members 42 which serve, as will be described, to support the platform means 14. On each side of the rectangular upper frame 40, there is provided a side frame 44 extending along the entire length of the rectangular upper frame 40. The side frame 44 comprises a lower tubular member 46 and a plurality of spaced, vertical brace members 48. A transverse end brace 50 is positioned at the rear of the vehicle 10 and extends between the side frames 44 for reinforcing the same.

At the rear of the frame 12, there is provided an operator supporting platform 52 (see FIGS. 2 and 5) which is supported for movement longitudinally of the frame 12 by means of spaced channel-shaped members 54, one each secured to the lower tubular member 46 of each of the side frames 44. The operator supporting platform 52 normally is stored beneath the rear drive support portion 18 when not in use, and may be pulled outwardly into the position illustrated in FIG. 2.

A hitching device 56 is provided at the rear of the frame 12. The hitching device 56 is of conventional design and comprises a plate member 58 secured to and extending across the upper frame 40 and the transverse end brace 50; and an angle member 60 which is secured and maintained spaced from the plate member 58 so as to provide a socket 62. The socket 62 is adapted to receive a support post carrying a seat upon which the operator may sit. The angle member 60 also is provided with a conventional hitching knob 64 whereby auxiliary equipment may be driven cross-country.

Platform means 14

Referring now to FIGS. 1–3 and 5, the platform means 14 preferably comprises a single steel plate 66 which overlies the upper frame 40 and is secured thereto by any suitable means such as bolting or welding. Alternatively, the platform means 14 may be formed from a plurality of steel plates wherein those plates forming the forward load-carrying portion 16 comprises the well-known safety plate having a raised lug pattern providing traction for the personnel carried on the vehicle 10.

Traction member 20

Referring now to FIGS. 1, 3 and 4, the flexible, endless ground engaging traction member 20 comprises a reinforced rubber belt 68 having a plurality of cleats 70 secured along the opposite sides thereof at uniformly spaced points therealong. The rubber belt 68 has a width which is substantially equal to the width of the platform 14. The rubber belt 68 and the cleats 70 provide for a large area of ground contact and therefore offer excellent flotation and stability characteristics to the vehicle 10. As can be seen in FIG. 4, a stiffening plate 71 is interposed between the cleats 70 and the rubber belt 68. The stiffening plates 71 extend transversely of the rubber belt 68 and provides additional reinforcement therefor.

The rubber belt 68 is operably mounted to the frame 12 by means of a plurality of spaced pairs of wheels 72 positioned within the rubber belt 68. Each pair of wheels 72 is supported on a common shaft 74 which is rotatably supported in journals 76 mounted to the underside of the lower tubular member 46 of the side frames 44. The forwardmost pair of wheels 72 has its shaft 74 supported in take-up journals 78 which permit the wheels 72 to be moved in an appropriate direction for the purpose of placing the rubber belt 68 under tension.

Referring now in particular to FIGS. 3 and 4, the traction member 20 is driven by means of a pair of spaced drive wheels 80 (only one visible) each having a plurality of equiangularly spaced drive lugs 82. A plurality of uniformly spaced lug engaging members 84 are secured to the rubber belt 68 and in alignment with the pair of spaced drive wheels 80. The overall arrangement is such that each of the drive lugs 82 is received in the space between adjacent ones of the lug engaging members 84 as illustrated in FIG. 3. The drive chain 28 rotates the pair of spaced drive wheels 80 and the drive lugs 82 engage the lug engaging members 84 for rotating the traction member 20 in the desired direction.

The lug engaging members 84 also serve as a means for maintaining the traction member 20 centered with respect to the pairs of wheels 72. As can be seen in FIG. 4, each of the wheels 72 has an inner beveled face 86 which engages a sloped face 88 provided on the outboard ends of each of the drive lugs 82. The lug engaging members 84 are spaced so that at least one member 84 is engaged with each of the wheels 72.

Steering means 34

As stated above, the present invention provides steering means of novel construction and of the type wherein the line of action of the thrust imposed by the operator on the steering means is opposite to the direction in which the vehicle 10 is to be turned. For example, if the vehicle is to be turned to the left, the steering means is pushed to the right and vice versa. It will become apparent hereafter that the operator-imposed thrust aids in turning the vehicle; that the steering means of the present invention permits the vehicle to be turned easily; and that the present steerable, load-supporting vehicle has all of the desirable features inherent in vehicles of this type plus an excellent steering characteristic.

A description of the present steering means 34 will now follow with reference to FIGS. 5, 7A–7C, 8 and 9. As stated above, the steering means 34 comprises handlebar means 36, a pair of guide wheels 38, and a reverse acting linkage means 39 which operatively connects the handlebar means 36 to the guide wheels 38 whereby the guide wheels 38 are pivoted in a direction which is opposite to the direction in which the handlebar means 36 are pivoted.

In the present steering means 34, there are two handlebar means hereinafter designated 36L and 36R, which are similar in construction and which are illustrated in FIGS. 8 and 9. In FIG. 8, the left-hand handlebar means 36L is shown comprising a tubular member 100 having a vertical lower end portion 102 and a horizontal upper end portion 104. The vertical lower end portion 102 extends through and is rotatable in a tubular post 106 secured to the steel plate 66. A collar 108 is secured to the vertical lower end portion 102 and engages the tubular post 106 to limit the downward movement of the vertical end portion 102 through the tubular post 106. The vertical lower end portion 102 is retained within the tubular post 106 by means, for example, of a cotter pin 110.

A handle grip 112 is fitted over the horizontal upper end portion 104 and is adapted to be gripped by the operator. Projecting upwardly from and inclined forwardly of the horizontal upper end portion 104 is an auxiliary tubular member 113 provided with a second handle grip 114 which is grasped by the operator when the operator stands on the aforementioned platform 52 (see FIG. 2). The left-hand handlebar means 36L may be pivoted transversely of the platform 14 in the tubular post 106.

Associated with the left-hand handlebar means 36L and in particular with the horizontal upper end portion 104, is a clutch lever 116 which when raised upwardly tensions a cable 118 which, in turn, engages a conventional clutch (not shown) to place the vehicle in motion. Conversely, when the clutch lever 116 is released, the clutch is disengaged. A second clutch lever 120 is pivotally mounted on the second handle grip 114 and operatively connected to the first clutch lever 116. When the operator stands on the aforementioned platform 52, he may control the engagement and disengagement of the clutch by means of the second clutch lever 120.

The right-hand handlebar means 36R is illustrated in FIG. 9 and is similar in construction with the left-hand handlebar means 36L of FIG. 8. Consequently, corresponding numerals will be employed to identify corresponding parts already described. As can be seen in FIG. 9, the right-hand handlebar means 36R also is formed from a tubular member 100 have a vertical lower end portion 122, a horizontal upper end portion 104 provided with a handle grip 112, and an auxiliary tubular member 113 with a second handle grip 114. The right-hand handlebar means 36R is pivotal transversely of the platform 14 in a tubular post 106. The vertical lower end portion 122 projects beneath the steel plate 66 and has a first pivot plate 124 (to be described) secured thereto for pivotal movement in a horizontal plane.

Associated with the horizontal upper end portion 104 of the right-hand handlebar means 36R, is a brake lever 126 which when elevated serves to tension a cable 128 connected to the conventional brake 29 (see FIG. 1) for halting the vehicle 10.

Referring now to FIG. 7A, the right-hand and left-hand handlebar means 36R, 36L, are connected together by means of a tie member 130 which is pivotally connected at each of its ends to lugs 132 projecting laterally from each of the handlebar means 36R, 36L. The overall arrangement is such that the handlebar means 36R, 36L may be moved simultaneously, transversely of the platform 14 for the purpose of steering the vehicle 10, as will be described.

The pair of guide wheels 38 may, as illustrated in FIG. 5, be mounted on a common carriage 134 which is rigidly connected to a second pivot plate 136 (to be described) for guiding pivotal movement therewith about an axis extending perpendicular to the platform 14. In this embodiment, the pair of guide wheels 38 are positioned beneath the rear drive support portion 18 and within the confines of the frame 12. Since nothing projects beyond the sides of the frame 12, the vehicle 10 is permitted to pass through relatively narrow openings whose width is slightly greater than the width of the frame 12.

Figure 10:
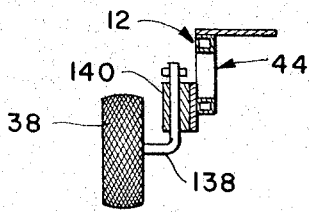
FIG. 10 is a cross-sectional view taken along the line X—X of FIG. 7A.

Alternatively, as illustrated in FIGS. 7A and 10, for example, each of the guide wheels 38 may be journaled to an L-shaped axle 138 which, in turn, is rotatably supported in a journal 140 secured to the side frame 44 of the frame 12. Each of the guide wheels 38 thus is pivotal about the vertical central axis of the journal 140, i.e., transversely of the platform 14. In this embodiment, each of the guide wheels 38 is positioned outboard of the platform 14 and hence provides greater stability for the vehicle 10.

The reverse acting linkage means 39 will now be described with reference to FIGS. 5 and 7A. The first pivot plate 124 extends transversely of the frame 12. The second pivot plate 136 has an L-shaped configuration including a first arm 142 extending toward the first pivot plate 124 in alignment therewith and a second arm 144 extending perpendicularly from the first arm 142 toward the rear of the vehicle 10. The second pivot arm 136 is preferably positioned centrally beneath the rear support portion 18 and is provided with a shaft 146 rotatably supported in a journal 148.

As can best be seen in FIG. 7A, the reverse acting linkage means 39 also includes lever means 150 which connects the first and second pivot plates 124, 136 whereby the second pivot plate 136 is pivoted in a direction counter to the direction of pivoting of the first pivot plate 124. The lever means 150 comprises an elongated idler arm 152 having one end pivotally mounted as at 154 to the underside of the steel plate 66. The elongated idler arm 152 normally extends transversely of the frame 12 when the vehicle 10 is moving straight ahead. A first connecting arm 156 extends between and is pivotally secured at each of its ends to the first pivot plate 124 and the elongated idler arm 152. A second connecting arm 158 extends between and is pivotally secured at each of its ends to the first arm 142 of the second pivot plate 136 and the elongated idler arm 152. As will become apparent, pivoting of the first pivot plate 124 in a counterclockwise direction will cause pivoting of the second pivot plate 136 in a clockwise direction; and pivoting of the first pivot plate 124 in a clockwise direction will cause pivoting of the second pivot plate 136 in a counterclockwise direction.

When the guide wheels 38 are disposed outboard of the frame 12, as illustrated in FIG. 7A, a connecting plate 160 is pivotally secured to the second arm 144 of the second pivot plate 136. Extending from either end of the connecting plate 160 is a connecting rod 162 having its outboard end pivotally connected to a steering arm 164 rigidly connected to the L-shaped axle 138. The connecting plate 160, connecting rods 162 and steering arms 164 cooperate to turn the guide wheels 38 simultaneous with the pivoting of the second pivot plate 136 and transversely of the frame 12 so that the vehicle 10 may be turned to the right or to the left.

*Operation of steering means 34*

As can be seen in FIG. 7B, the handlebar means 36R, 36L have been pivoted to the right, that is, in a counterclockwise direction. By means of the reverse acting linkage means 39, the guide wheels 38 are pivoted in a clockwise direction which is counter to the direction of pivoting of the handlebar means 36R, 36L. In their pivoted position, the guide wheels 38 will turn the vehicle 10 to the left. In order to pivot the handlebar means 36R, 36L in a counterclockwise direction, the operator is required to impose a thrust whose line of action is indicated by the arrow 166. The thrust is directed to the left of the vehicle 10 and is opposite to the direction in which the vehicle 10 is to be turned. Hence, the operator-imposed thrust tends to move the rear portion of the vehicle 10 to the rigtht and, as should be apparent, aids in turning the vehicle to the left.

As can be seen in FIG. 7C, the handlebar means 36R, 36L have been pivoted to the left of the frame 12, that is in a clockwise direction. By means of the reverse acting linkage means 39, the guide wheels 38 have been pivoted in a counterclockwise direction which is counter to the pivoting of the handlebar means 36R, 36L. In their pivoted position, the guide wheels 38 will turn the vehicle 10 to the right. In order to pivot the handlebar means 36R, 36L in a clockwise direction, the operator is required to impose a thrust thereon whose line of action is indicated by the arrow 168. The thrust is directed to the left of the vehicle 10 and is opposite to the direction in which the vehicle 10 is to be turned. Hence, the operator-imposed thrust tends to move the rear portion of the vehicle 10 to the left and, as should be apparent, aids in turning the vehicle 10 to the right.

Although the invention has been shown in connection with certain specific embodiments, it will be readily apparent to those skilled in the art that various changes in form and arrangement of parts may be made to suit requirements without departing from the spirit and scope of the invention.

I claim as my invention:

1. In a vehicle, a frame having platform means thereon providing a forward load-carrying portion and a rear drive support portion, drive means mounted on said rear support portion, flexible, endless ground engaging traction means operably mounted on said frame beneath said platform means, means connecting said drive means to said traction means for driving the same, ground engaging guide wheels mounted to said rear support portion for pivotal guiding movement transversely of said vehicle, steering means mounted on said rear support portion of said platform means and being adapted to receive an operator-imposed thrust for turning said steering means, and reverse acting linkage means operatively connecting said steering means to said guide wheels for pivoting said guide wheels in a direction which is counter to the direction of pivoting of said steering means, whereby said vehicle turns in a direction which is opposite to said operator-imposed thrust.

2. The vehicle of claim 1 wherein said steering means comprises two handlebars, one pivotally mounted at each of the opposite sides of said rear support portion of said platform means, said handlebars projecting rearwardly from said rear support portion and having horizontal portions, and a tie member extending between said horizontal portions for connecting said handlebars.

3. In a vehicle, a frame having platform means thereon providing a forward load-carrying portion and a rear drive support portion, drive means mounted on said rear support portion, flexible, endless ground engaging traction means operably mounted on said frame beneath said forward load supporting portion, means connecting said drive means to said traction means for driving the same, a pair of ground engaging guide wheels, carriage means pivotally mounted at said rear support portion beneath said platform means for supporting said guide wheels for pivotal guiding movement transversely of said vehicle, said guide wheels being disposed within the lateral sides of said platform means, steering means mounted on said rear support portion of said platform means and being adapted to receive an operator-imposed thrust for turning said steering means, and reverse acting linkage means operatively connecting said steering means to said guide wheels for pivoting said guide wheels in the direction opposite to the pivotal movement of said steering means, whereby said vehicle turns in a direction opposite to the operator-imposed thrust.

4. In a vehicle, a frame having platform means thereon providing a forward load-carrying portion and a rear drive support portion, drive means mounted on said rear support portion, flexible, endless ground engaging traction means operably mounted on said platform means beneath said forward load supporting portion, means connecting said drive means to said traction means for driving the same, a ground engaging guide wheel positioned at said rear support portion and outboard of each of the opposite sides of said rear support portion, means mounting each of said guide wheels for pivotal guiding movement transversely of said vehicle, rod means connecting said guide wheels whereby said guide wheels are pivoted in unison and in the same direction, steering means mounted on said rear support portion of said platform means and being adapted to receive an operator-imposed thrust for turning said steering means, and reverse acting linkage means operatively connecting said steering means to said guide wheels for pivoting said guide wheels in a direction which is opposite to the pivotal movement of said steering means, whereby said vehicle turns in a direction opposite to the operator-imposed thrust.

5. In a vehicle, a frame having platform means thereon providing a forward load-carrying portion and a rear drive support portion, drive means mounted on said rear support portion, flexible, endless ground engaging traction means operably mounted on said frame beneath said forward load-carrying portion, means connecting said drive means to said traction means for driving the same, steering means comprising two handlebars, one each pivotally mounted on the opposite sides of said rear support portion for simultaneous pivotal movement transversely of said vehicle, said handlebars projecting rearwardly of said platform means and being positioned to receive an operator-imposed thrust for turning the same, a first pivot plate rigidly secured to the lower end of one of said handlebars beneath said rear support portion, a second pivot plate mounted on the underside of said rear support portion for pivotal movement about an axis extending perpendicularly to said platform means, ground engaging guide wheels, carriage means connecting said guide wheels to said first pivot plate for simultaneous pivotal movement transversely of said vehicle, and lever means connecting said first pivot plate to said second pivot plate for pivoting said first pivot plate in a direction counter to the direction of pivoting of said second pivot plate, whereby said vehicle turns in a direction opposite to the thrust imposed on said handlebars.

References Cited by the Examiner

UNITED STATES PATENTS 2,708,978  5/1955  Robitaille _____ 180—5 X

FOREIGN PATENTS 499,819  2/1954  Canada.
312,833  6/1929  Great Britain.
595,695  12/1947  Great Britain.

BENJAMIN HERSH, *Primary Examiner.*

R. J. JOHNSON, *Assistant Examiner.*